United States Patent
Kishi

(10) Patent No.: US 12,428,521 B2
(45) Date of Patent: Sep. 30, 2025

(54) CYCLOOLEFIN RING-OPENED COPOLYMER, COMPOSITION FOR ELECTRICALLY INSULATING MATERIAL, AND ELECTRICALLY INSULATING MATERIAL

(71) Applicant: ZEON CORPORATION, Tokyo (JP)

(72) Inventor: Naoya Kishi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 594 days.

(21) Appl. No.: 17/904,291

(22) PCT Filed: Feb. 19, 2021

(86) PCT No.: PCT/JP2021/006474
§ 371 (c)(1),
(2) Date: Aug. 16, 2022

(87) PCT Pub. No.: WO2021/172227
PCT Pub. Date: Sep. 2, 2021

(65) Prior Publication Data
US 2023/0095059 A1 Mar. 30, 2023

(30) Foreign Application Priority Data

Feb. 27, 2020 (JP) .................. 2020-032303

(51) Int. Cl.
*C08G 61/06* (2006.01)

(52) U.S. Cl.
CPC .................. *C08G 61/06* (2013.01)

(58) Field of Classification Search
USPC ................. 526/259, 268, 281, 283
See application file for complete search history.

(56) References Cited

U.S. PATENT DOCUMENTS

| | | | |
|---|---|---|---|
| 3,959,234 A * | 5/1976 | Kurosawa ............ | C08G 61/08 526/138 |
| 4,994,535 A * | 2/1991 | Endo ............... | C08G 61/08 526/280 |
| 6,423,780 B1 | 7/2002 | Dershem et al. | |
| 2012/0181702 A1 | 7/2012 | Lee et al. | |
| 2014/0087293 A1 | 3/2014 | Kandanarachchi et al. | |
| 2019/0169329 A1 | 6/2019 | Kamei | |

FOREIGN PATENT DOCUMENTS

| | | |
|---|---|---|
| CN | 104211735 A | 12/2014 |
| CN | 105974734 A | 9/2016 |
| EP | 3202812 A1 | 8/2017 |
| FR | 1594934 A | 6/1970 |
| JP | 2002145962 A | 5/2002 |
| JP | 2005350544 A | 12/2005 |
| JP | 2008233362 A | 10/2008 |
| JP | 2012197440 A | 10/2012 |
| JP | 2019104934 A | 6/2019 |
| JP | 2019112565 A | 7/2019 |
| TW | 201638669 A | 11/2016 |
| WO | 2006073270 A1 | 7/2006 |
| WO | 2008070774 A1 | 6/2008 |
| WO | 2011079439 A1 | 7/2011 |

OTHER PUBLICATIONS

Mar. 4, 2024, the Extended European Search Report issued by the European Patent Office in the corresponding European Patent Application No. 21760517.9.
Benjamin R. Elling et al., Efficient and Facile End Group Control of Living Ring-Opening Metathesis Polymers via Single Addition of Functional Cyclopropenes, ACS Macro Letters, 2018, pp. 656-661, vol. 7, Issue 6, XP93131599.
Aug. 30, 2022, International Preliminary Report on Patentability issued in the International Patent Application No. PCT/JP2021/006474.
Jun. 16, 2025, Communication pursuant to Article 94(3) EPC issued by the European Patent Office in the corresponding European Patent Application No. 21760517.9.

\* cited by examiner

*Primary Examiner* — Fred M Teskin
(74) *Attorney, Agent, or Firm* — KENJA IP LAW PC

(57) ABSTRACT

A cycloolefin ring-opened copolymer includes a structural unit derived from a norbornene compound that includes a heteroelement-containing hydrocarbon group and a structural unit derived from a norbornene compound that includes a heteroelement-free hydrocarbon group. In this copolymer, the structural unit derived from the norbornene compound that includes the heteroelement-containing hydrocarbon group has a proportional content of not less than 0.01 mol % and not more than 15.00 mol % when all structural units included in the copolymer are taken to be 100 mol %.

5 Claims, No Drawings

CYCLOOLEFIN RING-OPENED COPOLYMER, COMPOSITION FOR ELECTRICALLY INSULATING MATERIAL, AND ELECTRICALLY INSULATING MATERIAL

TECHNICAL FIELD

The present disclosure relates to a cycloolefin ring-opened copolymer, a composition for an electrically insulating material containing this cycloolefin ring-opened copolymer, and an electrically insulating material containing this composition for an electrically insulating material.

BACKGROUND

Polymers that include units having a norbornene skeleton (hereinafter, also referred to as "norbornene-based polymers") are known to be capable of displaying various beneficial characteristics. Norbornene-based polymers are suitably adopted in a variety of applications so as to exploit these characteristics. In recent years, attempts have been made to enhance norbornene-based polymers with the aim of further improving adaptability in various applications.

As one specific example, Patent Literature (PTL) 1 discloses a norbornene-based cross-linked polymer that includes 50 mass % or more of at least one selected from the group consisting of a dicyclopentadiene-based monomer unit, a tetracyclododecene-based monomer unit, and a tricyclopentadiene-based monomer unit and that has a glass-transition temperature of 240° C. or higher. As another example, PTL 2 discloses an addition polymer that includes a unit having a norbornene skeleton and a unit having a norbornene skeleton that includes a maleimide-containing group. As yet another example, PTL 3 discloses an addition polymer and a ring-opened polymer that include at least a unit having a norbornene skeleton that includes a radical.

CITATION LIST

Patent Literature

PTL 1: JP2019-104934A
PTL 2: WO2008/070774A1
PTL 3: JP2012-197440A

SUMMARY

Technical Problem

In recent years, norbornene-based polymers have been of interest in applications as electrically insulating materials due to the high heat resistance that is one characteristic thereof. In order to be used as an electrically insulating material, it is necessary for a norbornene-based polymer to be capable of displaying a high breakdown voltage. However, depending on the chemical composition of a conventional norbornene-based polymer such as described above, it has not been possible to sufficiently increase the breakdown voltage.

Accordingly, one object of the present disclosure is to provide a cycloolefin ring-opened copolymer having a sufficiently high breakdown voltage.

Another object of the present disclosure is to provide a composition for an electrically insulating material that can advantageously be used in the formation of an electrically insulating material.

Yet another object of the present disclosure is to provide an electrically insulating material that can display excellent performance.

Solution to Problem

The inventor conducted diligent investigation with the aim of solving the problem set forth above. The inventor made a new discovery that with regards to a cycloolefin ring-opened copolymer including a structural unit derived from a norbornene compound that includes a heteroelement-containing hydrocarbon group and a structural unit derived from a norbornene compound that includes a heteroelement-free hydrocarbon group, by setting the proportional content of the structural unit derived from the norbornene compound that includes the heteroelement-containing hydrocarbon group as not less than 0.01 mol % and not more than 15.00 mol %, it is possible to sufficiently increase the breakdown voltage. In this manner, the inventor completed the present disclosure.

Specifically, the present disclosure aims to advantageously solve the problem set forth above, and a presently disclosed cycloolefin ring-opened copolymer comprises: a structural unit derived from a norbornene compound that includes a heteroelement-containing hydrocarbon group; and a structural unit derived from a norbornene compound that includes a heteroelement-free hydrocarbon group, wherein the structural unit derived from the norbornene compound that includes the heteroelement-containing hydrocarbon group has a proportional content of not less than 0.01 mol % and not more than 15.00 mol % when all structural units included in the cycloolefin ring-opened copolymer are taken to be 100 mol %. When the structural unit derived from the norbornene compound that includes the heteroelement-containing hydrocarbon group has a proportional content of not less than 0.01 mol % and not more than 15.00 mol % in the cycloolefin ring-opened copolymer including specific structural units in this manner, the breakdown voltage can be sufficiently increased.

Note that a "structural unit" in a copolymer is a unit that can form a copolymer through repetition of that unit. Moreover, the "proportional content of a structural unit" can be measured by a nuclear magnetic resonance (NMR) method such as $^1$H-NMR or $^{13}$C-NMR.

In the presently disclosed cycloolefin ring-opened copolymer, the structural unit derived from the norbornene compound that includes the heteroelement-free hydrocarbon group preferably has a proportional content of not less than 85.00 mol % and not more than 99.99 mol % when all structural units included in the cycloolefin ring-opened copolymer are taken to be 100 mol %. When the structural unit derived from the norbornene compound that includes the heteroelement-free hydrocarbon group has a proportional content of not less than 85.00 mol % and not more than 99.99 mol % in the cycloolefin ring-opened copolymer including specific structural units, the breakdown voltage of the cycloolefin ring-opened copolymer can be further increased.

In the presently disclosed cycloolefin ring-opened copolymer, the heteroelement-containing hydrocarbon group preferably has a cyclic structure. When the heteroelement-containing hydrocarbon group of the structural unit derived from the norbornene compound that includes the heteroelement-containing hydrocarbon group has a cyclic structure, the breakdown voltage of the cycloolefin ring-opened copolymer can be further increased.

In the presently disclosed cycloolefin ring-opened copolymer, the structural unit derived from the norbornene compound that includes the heteroelement-free hydrocarbon group preferably includes a structural unit derived from a norbornene compound that includes a heteroelement-free hydrocarbon group and an aromatic ring. When the structural unit derived from the norbornene compound that includes the heteroelement-free hydrocarbon group includes a structural unit derived from a norbornene compound that includes a heteroelement-5 free hydrocarbon group including an aromatic ring, the breakdown voltage of the cycloolefin ring-opened copolymer can be further increased.

Moreover, the present disclosure aims to advantageously solve the problem set forth above, and a presently disclosed composition for an electrically insulating material comprises any one of the cycloolefin ring-opened copolymers set forth above. The composition for an electrically insulating material containing the cycloolefin ring-opened copolymer set forth above can advantageously be used in the formation of an electrically insulating material.

Furthermore, the present disclosure aims to advantageously solve the problem set forth above, and a presently disclosed electrically insulating material is formed using the composition for an electrically insulating material set forth above. The electrically insulating material formed using the composition for an electrically insulating material set forth above can display excellent performance.

Advantageous Effect

According to the present disclosure, it is possible to provide a cycloolefin ring-opened copolymer having a sufficiently high breakdown voltage.

Moreover, according to the present disclosure, it is possible to provide a composition for an electrically insulating material that can advantageously be used in the formation of an electrically insulating material.

Furthermore, according to the present disclosure, it is possible to provide an electrically insulating material that can display excellent performance.

DETAILED DESCRIPTION

The following provides a detailed description of embodiments of the present disclosure.

The presently disclosed cycloolefin ring-opened copolymer can suitably be used in the formation of an electrically insulating material as a result of having a sufficiently high breakdown voltage.

(Cycloolefin Ring-Opened Copolymer)

The cycloolefin ring-opened copolymer may be obtained by, for example, performing ring-opening polymerization of a monomer composition containing a norbornene compound that includes a heteroelement-containing hydrocarbon group and a norbornene compound that includes a heteroelement-free hydrocarbon group in the presence of a polymerization catalyst. The presently disclosed cycloolefin ring-opened copolymer includes a structural unit derived from a norbornene compound that includes a heteroelement-free hydrocarbon group and also includes a structural unit derived from a norbornene compound that includes a heteroelement-containing hydrocarbon group in a proportion of not less than 0.01 mol % and not more than 15.00 mol %.
<Structural Unit Derived from Norbornene Compound Including Heteroelement-Containing Hydrocarbon Group>

Examples of norbornene compounds that can form a structural unit derived from a norbornene compound that includes a heteroelement-containing hydrocarbon group (hereinafter, also referred to as "heteroelement-containing norbornene compounds") include norbornene compounds represented by the following formula

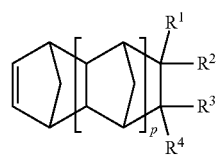

(1)

In formula (1), p is an integer of 0 to 4, $R^1$ to $R^4$ are each, independently of one another, a hydrogen atom, a single bond, a heteroelement-free hydrocarbon group, or a heteroelement-containing hydrocarbon group, at least one of $R^1$ to $R^4$ is a heteroelement-containing hydrocarbon group, and two or more of $R^1$ to $R^4$ may be bonded to one another to form a monocycle or a polycycle.

More specifically, examples of heteroelement-containing hydrocarbon groups that can constitute $R^1$ to $R^4$ include a substituted or unsubstituted imide group, a substituted or unsubstituted maleimide group, a substituted or unsubstituted carbonyl group, and a substituted or unsubstituted epoxy group. The phrase "substituted or unsubstituted" as used in the present specification means including one or more substituents or not including a substituent.

Examples of heteroelement-free hydrocarbon groups that can constitute $R^1$ to $R^4$ include a substituted or unsubstituted alkyl group having a carbon number of 1 to 20 and a substituted or unsubstituted aryl group having a carbon number of 1 to 40.

In a case in which any of the various groups described above includes a substituent, the substituent may be a linear or branched alkyl group having a carbon number of 1 to 20 or an aryl group having a carbon number of 6 to 40, for example, but is not specifically limited thereto.

In particular, it is preferable that in formula (1), p is 0, one of $R^1$ to $R^4$ is a substituted or unsubstituted imide group, a cyclic structure is formed by this imide group with another one of $R^1$ to $R^4$, and a fused ring structure is formed by this cyclic structure with the norbornene ring. In this case, it is preferable that the remaining two among $R^1$ to $R^4$ are hydrogen atoms and that the heteroelement-containing norbornene compound is a maleimide-modified norbornene compound satisfying the following formula (2).

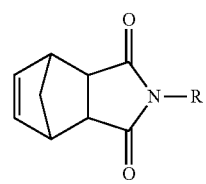

(2)

In the preceding formula, R is hydrogen or a linear or branched alkyl group having a carbon number of 1 to 10. In particular, R is preferably a linear or branched alkyl group having a carbon number of 1 to 6 such as a methyl group, an ethyl group, an n-butyl group, a t-butyl group, an n-propyl group, or an i-propyl group, of which, an n-butyl group, a t-butyl group, or an i-propyl group is more preferable as R.

Note that one of the heteroelement-containing norbornene compounds described above may be used individually, or two or more of the heteroelement-containing norbornene compounds described above may be used in combination.

The proportional content of structural units derived from a norbornene compound that includes a heteroelement-containing hydrocarbon group among all structural units (100 mol %) included in the cycloolefin ring-opened copolymer is preferably not less than 0.10 mol % and not more than 10.00 mol %, and more preferably not less than 0.50 mol % and not more than 5.00 mol %. Through the copolymer including structural units derived from a norbornene compound that includes a heteroelement-containing hydrocarbon group in a proportion that is within any of the ranges set forth above, the breakdown voltage can be further increased.

<Structural Unit Derived from Norbornene Compound Including Heteroelement-Free Hydrocarbon Group>

Examples of norbornene compounds that can form a structural unit derived from a norbornene compound that includes a heteroelement-free hydrocarbon group (hereinafter, also referred to as "heteroelement-free norbornene compounds") include norbornene compounds represented by the following formula (3).

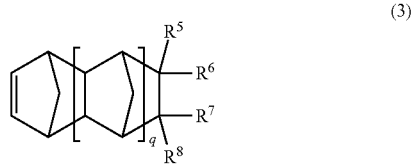

(3)

In formula (3), q is an integer of 0 to 4, and $R^5$ to $R^8$ are each a hydrogen atom or a substituted or unsubstituted hydrocarbon group. Note that in a case in which a hydrocarbon group that can constitute $R^5$ to $R^8$ includes a substituent, this substituent is also a heteroelement-free group.

In particular, it is preferable to use at least a heteroelement-free norbornene compound that includes an aromatic ring as a heteroelement-free norbornene compound. Moreover, it is more preferable to use a heteroelement-free norbornene compound that includes an aromatic ring and a heteroelement-free norbornene compound that does not include an aromatic ring in combination as heteroelement-free norbornene compounds. In other words, structural units derived from a norbornene compound that includes a heteroelement-free hydrocarbon group preferably include at least a structural unit derived from a heteroelement-free norbornene compound that includes an aromatic ring, and more preferably include a structural unit derived from a heteroelement-free norbornene compound that includes an aromatic ring and a structural unit derived from a heteroelement-free norbornene compound that does not include an aromatic ring.

<<Structural Unit Derived from Heteroelement-Free Norbornene Compound Including Aromatic Ring>>

Examples of heteroelement-free norbornene compounds including an aromatic ring that can be used to form a structural unit derived from a heteroelement-free norbornene compound that includes an aromatic ring include compounds that include an aromatic ring and a norbornene ring in a molecule thereof.

Note that the aromatic ring and the norbornene ring may each be present separately as a monocycle or may form a fused ring. In particular, it is preferable that the aromatic ring and the norbornene ring form a fused ring from a viewpoint of further increasing the breakdown voltage.

The aromatic ring may be an aromatic hydrocarbon ring such as a benzene ring, a naphthalene ring, or an anthracene ring without any specific limitations.

Examples of compounds including an aromatic ring and a norbornene ring in a molecule thereof (heteroelement-free norbornene compounds including an aromatic ring) include, but are not specifically limited to, phenylnorbornene such as 5-phenyl-2-norbornene, 5-methyl-5-phenyl-bicyclo[2.2.1]hept-2-ene, 5-benzyl-bicyclo[2.2.1]hept-2-ene, 5-tolyl-bicyclo[2.2.1]hept-2-ene (i.e., 5-(4-methylphenyl)-2-norbornene), 5-(ethylphenyl)-bicyclo[2.2.1]hept-2-ene, 5-(isopropylphenyl)-bicyclo[2.2.1]hept-2-ene, 8-phenyl-tetracyclo[4.4.0.1$^{2,5}$.1$^{7,10}$]-3-dodecene, 8-methyl-8-phenyl-tetracyclo[4.4.0.1$^{2,5}$.1$^{7,10}$]-3-dodecene, 8-benzyl-tetracyclo[4.4.0.1$^{2,5}$.1$^{7,10}$]-3-dodecene, 8-tolyl-tetracyclo[4.4.0.1$^{2,5}$.1$^{7,10}$]-3-dodecene, 8-(ethylphenyl)-tetracyclo[4.4.0.1$^{2,5}$.1$^{7,10}$]-3-dodecene, 8-(isopropylphenyl)-tetracyclo[4.4.0.1$^{2,5}$.1$^{7,10}$]-3-dodecene, 8,9-diphenyl-tetracyclo[4.4.0.1$^{2,5}$.1$^{7,10}$]-3-dodecene, 8-(biphenyl)-tetracyclo[4.4.0.1$^{2,5}$.1$^{7,10}$]-3-dodecene, 8-(β-naphthyl)-tetracyclo[4.4.0.1$^{2,5}$.1$^{7,10}$]-3-dodecene, 8-(α-naphthyl)-tetracyclo[4.4.0.1$^{2,5}$.1$^{7,10}$]-3-dodecene, 8-(anthracenyl)-tetracyclo[4.4.0.1$^{2,5}$.1$^{7,10}$]-3-dodecene, 11-phenyl-hexacyclo[6.6.1.1$^{3,6}$.1$^{10,13}$.0$^{2,7}$.0$^{9,14}$]-4-heptadecene, 6-(α-naphthyl)-bicyclo[2.2.1]-hept-2-ene, 5-(anthracenyl)-bicyclo[2.2.1]-hept-2-ene, 5-(biphenyl)-bicyclo[2.2.1]-hept-2-ene, 5-(β-naphthyl)-bicyclo[2.2.1]-hept-2-ene, 5,6-diphenyl-bicyclo[2.2.1]-hept-2-ene, 1,4-methano-1,4,4a,4b,5,8,8a,9a-octahydrofluorene, 1,4-methano-1,4,4a,9a-tetrahydrofluorene, 1,4-methano-8-methyl-1,4,4a,9a-tetrahydrofluorene, 1,4-methano-1,4,4a,9a-tetrahydrodibenzofuran, 1,4-methano-1,4,4a,5,10,10a-hexahydroanthracene, 7,10-methano-6b,7,10,10a-tetrahydrofluoranthene, cyclopentadiene-acenaphthylene adduct, a compound having cyclopentadiene further added to cyclopentadiene-acenaphthylene adduct, 11,12-benzo-pentacyclo[6.5.1.1$^{3,6}$.0$^{2,7}$.0$^{9,13}$]-4-pentadecene, 11,12-benzo-pentacyclo[6.6.1.1$^{3,6}$.0$^{2,7}$.0$^{9,14}$]-4-hexadecene, and 14,15-benzo-heptacyclo[8.7.0.1$^{2,9}$.1$^{4,7}$.1$^{11,17}$.0$^{3,8}$.0$^{12,16}$]-5-eicosene. Note that one of the heteroelement-free norbornene compounds including an aromatic ring that are described above may be used individually, or two or more of these compounds may be used in combination.

Of these compounds, 1,4-methano-1,4,4a,9a-tetrahydrofluorene is more preferable from a viewpoint of further increasing the breakdown voltage.

<<Structural Unit Derived from Heteroelement-Free Norbornene Compound not Including Aromatic Ring>>

Examples of norbornene compounds that can form a structural unit derived from a heteroelement-free norbornene compound that does not include an aromatic ring (heteroelement-free norbornene compounds not including an aromatic ring) include, but are not specifically limited to, norbornene; alkyl group-containing norbornenes such as 5-methylnorbornene, 5-ethylnorbornene, 5-butylnorbornene, 5-hexylnorbornene, 5-decylnorbornene, 5-cyclohexylnorbornene, and 5-cyclopentylnorbornene; alkenyl group-containing norbornenes such as 5-ethylidene norbornene, 5-vinylnorbornene, 5-propenylnorbornene, 5-cyclohexenylnorbornene, and 5-cyclopentenylnorbornene; dicyclopentadienes such as dicyclopentadiene, tricyclo[4.3.0.1$^{2,5}$]dec-3-ene, and tricyclo[4.4.1$^{2,5}$.0]undec-3-ene; tetracyclododecene (tetracyclo[6.2.1.1$^{3,6}$.0$^{2,7}$]dodec-4-ene); alkyl group-containing tetracyclododecenes such as 8-methyltetracyclododecene, 8-ethyltetracyclododecene, 8-cyclohexyltetracyclododecene, and 8-cyclopentyltetracyclododecene; tetracyclododecenes including a double bond outside of the ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; hexacycloheptadecene; alkyl group-containing hexacycloheptadecenes such as 12-methylhexacycloheptadecene, 12-ethylhexacycloheptadecene, 12-cyclohexylhexacycloheptadecene, and 12-cyclopentylhexacycloheptadecene; and hexacycloheptadecenes including a double bond outside of the ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene. Note that one of these compounds may be used individually, or two or more of these compounds may be used in combination.

Of these compounds, dicyclopentadiene and tetracyclododecene (tetracyclo[6.2.1.1$^{3,6}$.0$^{2,7}$]dodec-4-ene) are preferable from a viewpoint of further increasing the breakdown voltage.

The proportion constituted by structural units derived from a norbornene compound that includes a heteroelement-free hydrocarbon group among all structural units (100 mol %) included in the cycloolefin ring-opened copolymer is required to be 99.99 mol % or less, is preferably 85.00 mol % or more, and is more preferably 99.50 mol % or less. When the proportion constituted by structural units derived from a norbornene compound that includes a heteroelement-free hydrocarbon group is within any of the ranges set forth above, the breakdown voltage can be further increased.

Moreover, when structural units derived from a norbornene compound that includes a heteroelement-free hydrocarbon group are taken to be 100 mol %, the proportion constituted by aromatic ring-containing units is preferably 10 mol % or more, and more preferably 25 mol % or more, and is preferably 90 mol % or less, and more preferably 75 mol % or less. When the proportion constituted by aromatic ring-containing units when structural units derived from a norbornene compound that includes a heteroelement-free hydrocarbon group are taken to be 100 mol % is within any of the ranges set forth above, the breakdown voltage can be further increased.

Note that although the cycloolefin ring-opened copolymer may optionally include a ring-opening polymerization unit derived from a cycloolefin monomer that does not have a norbornene structure as a unit not having a norbornene structure, the proportion constituted by units not having a norbornene structure among all structural units (100 mol %) included in the cycloolefin ring-opened copolymer is preferably 10% or less, more preferably 5% or less, and even more preferably 0%.

Examples of cycloolefin monomers not having a norbornene structure that can be used to introduce a unit not having a norbornene structure into the cycloolefin ring-opened copolymer include monocyclic cycloolefin monomers. The monocyclic cycloolefin may be a cyclic monoolefin or cyclic diolefin having a carbon number of typically 4 to 20, and preferably 4 to 10. Specific examples of cyclic monoolefins include cyclobutene, cyclopentene, methylcyclopentene, cyclohexene, methylcyclohexene, cycloheptene, and cyclooctene. Specific examples of cyclic diolefins include cyclohexadiene, methylcyclohexadiene, cyclooctadiene, methylcyclooctadiene, and phenylcyclooctadiene. One of these examples may be used individually, or a plurality of these examples may be used as a mixture.

<Production Method of Cycloolefin Ring-Opened Copolymer>

The presently disclosed cycloolefin ring-opened copolymer can be produced by a commonly known ring-opening polymerization method such as ring-opening polymerization using a metathesis polymerization catalyst.

The metathesis polymerization catalyst and additives that can optionally be used in conjunction therewith are not specifically limited and may be commonly known examples thereof such as a ruthenium carbene complex (for example, refer to JP2019-104934A and JP6104263B2). The used amounts of the catalyst, additives, and so forth may be selected as appropriate depending on the polymerization conditions and the like.

The polymerization reaction can be performed by bulk polymerization. In this case, polymerization conditions such as the polymerization temperature, the polymerization pressure, and the polymerization time can be adjusted as appropriate.

(Composition for Electrically Insulating Material)

The presently disclosed composition for an electrically insulating material contains the presently disclosed cycloolefin ring-opened copolymer set forth above and may optionally further contain various additives.

The presently disclosed composition for an electrically insulating material can particularly advantageously be used in the formation of an electrically insulating material as a result of containing a copolymer that has a high breakdown voltage.

Examples of additives that can be contained in the composition for an electrically insulating material include, but are not specifically limited to, fillers and the like described in JP2019-104934A, for example. The proportion in which an additive is added can be adjusted as appropriate depending on the application so long as the effect of improving the breakdown voltage is not lost.

(Electrically Insulating Material)

The presently disclosed electrically insulating material is a material that is formed using the presently disclosed composition for an electrically insulating material and can display excellent performance as a result of containing the presently disclosed cycloolefin ring-opened copolymer.

The shaping method by which the electrically insulating material is obtained is not specifically limited and may be RIM (Reaction Injection Molding), RTM (Resin Transfer Molding), potting, (solid or liquid) transfer molding, compression molding, print molding, vacuum forming, or the like. In particular, the presently disclosed electrically insulating material can suitably be produced by RIM in which a formulation containing a norbornene compound that includes a heteroelement-containing hydrocarbon group, a norbornene compound that includes a heteroelement-free hydrocarbon group, and a metathesis polymerization catalyst is subjected to bulk ring-opening polymerization inside a mold.

EXAMPLES

The following provides a more detailed description of the present disclosure through examples. However, the present disclosure is not in any way limited by these examples.

The following method was used for measurement and evaluation in each of the examples. Moreover, in the following description, "parts" and "%" used in expressing quantities are by mass, unless otherwise specified.

(Measurement of Breakdown Voltage)

A test sample obtained in each example or comparative example was fixed in place through sandwiching between two spherical electrodes in Fluorinert, which is an electrically insulating liquid, in accordance with JIS-C2110-1 (2010). Voltage application with respect to the test sample was performed by raising the voltage to 10 kV and then raising the voltage in increments of 1 kV at 10 seconds by a step-by-step voltage rise method. The voltage one step before shorting of the test sample occurred was recorded as the breakdown voltage of the test sample.

A value $V^i$ of the breakdown voltage recorded for each test sample was compared to a value $V^o$ of the breakdown voltage recorded for a test sample obtained using a base monomer mixture of the same chemical composition so as to determine an improvement ratio (%) (=$V^i/V^o \times 100-100$).

Example 1

<Production of Catalyst Solution>

A catalyst solution was obtained by dissolving 0.6 parts of a ruthenium catalyst (Zhan 1N) indicated by the following formula as a metathesis polymerization catalyst and 15 parts of 2,6-di-t-butyl-p-cresol (BHT) as an antioxidant in 82 parts of cyclopentanone.

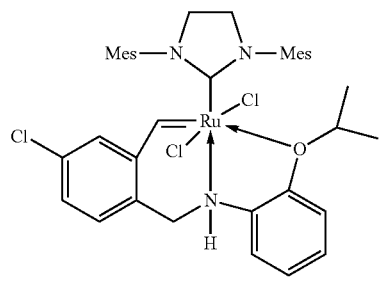

In the preceding formula, Mes indicates a mesityl group.

<Shaping of Sample Plate>

A base monomer mixture was obtained by weighing out and mixing 6.43 g (approximately 0.04 mol) of tetracyclo[6.2.1.1$^{3,6}$.0$^{2,7}$]dodec-4-ene (hereinafter, also abbreviated as "TCD"; molecular weight: 160.85 g/mol) as a heteroelement-free norbornene compound not including an aromatic ring and 7.32 g (approximately 0.04 mol) of 1,4-methano-1,4,4a,9a-tetrahydrofluorene (hereinafter, also abbreviated as "MTF"; molecular weight: 182.95 g/mol) as a heteroelement-free norbornene compound including an aromatic ring. A maleimide-modified norbornene monomer indicated by the following formula as a norbornene compound including a heteroelement-containing hydrocarbon group was dissolved in an amount of 0.41 g (approximately 0.002 mol) in the base monomer mixture at room temperature to obtain a resin solution. Next, 0.41 g of the catalyst solution produced as described above was added to the obtained resin solution and was mixed therewith by stirring to obtain a polymerizable composition.

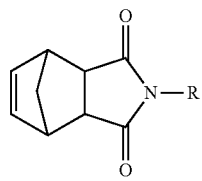

In the preceding formula, R is an isopropyl group.

A stainless steel male mold having a space of 100 mm in length by 100 mm in width by 0.15 mm in thickness was prepared as a mold. The polymerizable composition obtained as described above was poured into the space, another flat and smooth stainless steel plate was used to cover the upper surface while being careful to avoid the formation of gaps, and then heating was performed for 10 minutes at a temperature of 80° C. and a pressure of 10 MPa and for 10 minutes at a temperature of 120° C. and a pressure of 10 MPa in a press molding machine so as to perform a bulk ring-opening polymerization reaction and obtain a sample plate.

A 40 mm×40 mm slice was cut out from the obtained sample plate and was used as a test sample to measure the breakdown voltage at 23° C. by the previously described method. The results are shown in Table 1.

Example 2

A sample plate was shaped and measurement of breakdown voltage was performed in the same way as in Example 1 with the exception that 0.69 g (approximately 0.003 mol) of the maleimide-modified norbornene monomer was added to the base monomer mixture and was dissolved at room temperature. The results are shown in Table 1.

Example 3

A sample plate was shaped and measurement of breakdown voltage was performed in the same way as in Example 1 with the exception that 0.14 g (approximately 0.0007 mol) of the maleimide-modified norbornene monomer was added to the base monomer mixture and was dissolved at room temperature. The results are shown in Table 1.

Example 4

In production of a base monomer mixture, 2.78 g (approximately 0.02 mol) of dicyclopentadiene (hereinafter, also abbreviated as "DCP"; molecular weight: 132.2 g/mol) as a heteroelement-free norbornene compound not including an aromatic ring and 9.65 g (approximately 0.06 mol) of TCD were weighed out and mixed to obtain a base monomer mixture. The maleimide-modified norbornene monomer was added in an amount of 0.12 g (approximately 0.0006 mol) to the obtained base monomer mixture and was dissolved at room temperature. The resultant resin solution was used to shape a sample plate and measure breakdown voltage in the same way as in Example 1. The results are shown in Table 1.

Example 5

The maleimide-modified norbornene monomer was added in an amount of 0.62 g (approximately 0.003 mol) to the same base monomer mixture as in Example 4 and was dissolved at room temperature. The resultant resin solution was used to shape a sample plate and measure breakdown voltage in the same way as in Example 1. The results are shown in Table 1.

Comparative Example 1

The same base monomer mixture as in Example 4 was produced, this base monomer mixture was taken to be a resin solution by itself without adding the maleimide-modified norbornene, and the resultant resin solution was used to shape a sample plate and measure breakdown voltage in the same way as in Example 1. The results are shown in Table 1.

Comparative Example 2

DCP in an amount of 8.33 g (approximately 0.06 mol) and MTF in an amount of 3.66 g (approximately 0.02 mol) were mixed in production of a base monomer mixture, this base monomer mixture was taken to be a resin solution by itself without adding the maleimide-modified norbornene monomer, and the resultant resin solution was used to shape a sample plate and measure breakdown voltage in the same way as in Example 1. The results are shown in Table 1.

Comparative Example 3

The same base monomer mixture as in Example 1 was produced, this base monomer mixture was taken to be a resin solution by itself without adding the maleimide-modified norbornene, and the resultant resin solution was used to shape a sample plate and measure breakdown voltage in the same way as in Example 1. The results are shown in Table 1.

Comparative Example 4

The maleimide-modified norbornene monomer was dissolved in an amount of 3.36 g (approximately 0.016 mol) in the same base monomer mixture as in Example 1 at room temperature to obtain a resin solution. The resultant resin solution was used to shape a sample plate and measure breakdown voltage in the same way as in Example 1. The results are shown in Table 1.

It can also be seen from Comparative Example 4 in Table 1 that the effect of improvement of breakdown voltage could not be displayed in a case in which the additive amount of the maleimide-modified norbornene monomer exceeded 15.00 mol %.

INDUSTRIAL APPLICABILITY

According to the present disclosure, it is possible to provide a cycloolefin ring-opened copolymer having a sufficiently high breakdown voltage.

Moreover, according to the present disclosure, it is possible to provide a composition for an electrically insulating material that can advantageously be used in the formation of an electrically insulating material.

Furthermore, according to the present disclosure, it is possible to provide an electrically insulating material that can display excellent performance.

The invention claimed is:

1. A cycloolefin ring-opened copolymer comprising: a structural unit derived from a norbornene compound that includes a heteroelement-containing hydrocarbon group; and a structural unit derived from a norbornene compound that includes a heteroelement-free hydrocarbon group, wherein
the structural unit derived from the norbornene compound that includes the heteroelement-containing hydrocarbon group has a proportional content of not less than 0.01 mol % and not more than 15.00 mol % when all structural units included in the cycloolefin ring-opened copolymer are taken to be 100 mol %, and
the structural unit derived from the norbornene compound that includes the heteroelement-free hydrocarbon group

TABLE 1

| | Base monomer mixture | | | Heteroelement-containing NB | | Improvement ratio (%) |
| | Heteroelement-free NB | Molar ratio | Monomer | Additive amount (mol %) | Breakdown voltage (kV/mm) | |
|---|---|---|---|---|---|---|
| Example 1 | TCD/MTF | 50/50 | NBNiPr | 2.4 | 176.6 | 45.6 |
| Example 2 | TCD/MTF | 50/50 | NBNiPr | 3.6 | 155.5 | 28.2 |
| Example 3 | TCD/MTF | 50/50 | NBNiPr | 0.9 | 147.6 | 21.7 |
| Example 4 | DCP/TCD | 25/75 | NBNiPr | 0.7 | 135.6 | 53 |
| Example 5 | DCP/TCD | 25/75 | NBNiPr | 3.6 | 125.4 | 41.5 |
| Comparative Example 1 | DCP/TCD | 25/75 | None | 0 | 88.6 | — |
| Comparative Example 2 | DCP/MTF | 75/25 | None | 0 | 100.8 | — |
| Comparative Example 3 | TCD/MTF | 50/50 | None | 0 | 121.3 | — |
| Comparative Example 4 | TCD/MTF | 50/50 | NBNiPr | 17.0 | 68.2 | −43.8 |

In Table 1:
"NB" indicates norbornene compound;
"TCD" indicates tetracyclo[6.2.1.1$^{3,6}$.0$^{2,7}$]dodec-4-ene;
"MTF" indicates 1,4-methano-1,4,4a,9a-tetrahydrofluorene;
"DCP" indicates dicyclopentadiene; and
"NBNiPr" indicates isopropyl group-substituted maleimide-modified norbornene compound.

It can be seen from Table 1 that the cycloolefin ring-opened copolymers obtained in Examples 1 to 5, which each had an additive amount of a maleimide-modified norbornene monomer that was within a specific range (not less than 0.01 mol % and not more than 15.00 mol %), had an improved breakdown voltage compared to a copolymer obtained using the same base monomers.

includes a structural unit derived from a norbornene compound that includes a heteroelement-free hydrocarbon group and an aromatic ring.

2. The cycloolefin ring-opened copolymer according to claim 1, wherein the structural unit derived from the norbornene compound that includes the heteroelement-free hydrocarbon group has a proportional content of not less than 85.00 mol % and not more than 99.99 mol % when all structural units included in the cycloolefin ring-opened copolymer are taken to be 100 mol %.

3. The cycloolefin ring-opened copolymer according to claim 1, wherein the heteroelement-containing hydrocarbon group has a cyclic structure.

4. A composition for an electrically insulating material comprising the cycloolefin ring-opened copolymer according to claim 1.

5. An electrically insulating material comprising the composition for an electrically insulating material according to claim 4.

* * * * *